(12) United States Patent
Hwang

(10) Patent No.: US 6,899,902 B1
(45) Date of Patent: May 31, 2005

(54) DIETARY FIBER AND OLIGOSACCHARIDES FROM GINSENG AND PROCESS FOR PREPARATION THEREOF

(75) Inventor: Jaekwan Hwang, Goyang (KR)

(73) Assignee: Yonsei University, Seoul (KR)

( * ) Notice: Subject to any disclaimer, the term of this patent is extended or adjusted under 35 U.S.C. 154(b) by 0 days.

(21) Appl. No.: 10/089,157

(22) PCT Filed: Oct. 9, 2001

(86) PCT No.: PCT/KR01/01694

§ 371 (c)(1),
(2), (4) Date: Mar. 27, 2002

(87) PCT Pub. No.: WO02/30219

PCT Pub. Date: Apr. 18, 2002

(30) Foreign Application Priority Data

Oct. 9, 2000 (KR) .................................. 2000-59149
Oct. 21, 2000 (KR) .................................. 2000-62095

(51) Int. Cl.$^7$ ............................. A61K 35/78; A23L 1/30
(52) U.S. Cl. ...................................... 424/728; 426/648
(58) Field of Search ................. 424/728; 426/481, 426/489, 648, 655, 658

(56) References Cited

FOREIGN PATENT DOCUMENTS

| JP | 61-289853 | 12/1986 |
|----|-----------|---------|
| JP | 4-23958 | 1/1992 |
| JP | 5-317075 | 12/1993 |
| JP | 6-253778 | 9/1994 |
| JP | 6-253779 | 9/1994 |
| KR | 00124968 | 10/1995 |
| KR | 95-26392 | 10/1995 |
| KR | 97-70013 | * 11/1997 |

* cited by examiner

*Primary Examiner*—Christopher R. Tate

(57) ABSTRACT

The present invention relates to dietary fibers and oligosaccharides from Ginseng and process for preparation thereof, more particularly, to a method of preparing the dietary fiber from Ginseng by extruding and centrifuging byproducts from Ginseng extract, in the meantime, preparing the oligosaccharides from Ginseng by treating byproducts from Ginseng extract with polysaccharides hydrolytic enzymes and the subsequent ultrafiltration. Thus it provides prominent effects in producing physiologically active materials such as the dietary fibers and oligosaccharides from the said byproducts in an environment-friendly manner.

5 Claims, 7 Drawing Sheets

Note: 1. Pullulan(elution time 15:017min, M.W. 50,000)
2. Pullulan(elution time 15:683min, M.W. 23,000)
3. Pullulan(elution time 16:263min, M.W. 12,200)
4. Pullulan(elution time 17:083min, M.W. 5,800)
5. Pullulan(elution time 21:870min, M.W. 360)

1

DIETARY FIBER AND OLIGOSACCHARIDES FROM GINSENG AND PROCESS FOR PREPARATION THEREOF

TECHNICAL FIELD

The present invention relates to dietary fiber and oligosaccharides produced from ginseng and a process for preparation thereof, and to ginseng dietary fiber and a process for preparing the ginseng dietary fiber involving the extrusion of ginseng residue, and to ginseng oligosaccharides prepared by polysaccharide hydrolytic enzyme treatment of ginseng residue.

BACKGROUND ART

*Panax ginseng* C. A Meyer is a plant grown in the fair east of Asia (Northern latitude 33–48: Korea, North Manchuria—a part of Russia) and it belongs to *Araliaceae Panax* according to the plant taxonomy. In particular, ginseng grown in Korea is called Korean ginseng and is known to have excellent pharmaceutical properties. Ginseng products are classified into undried ginseng, red ginseng, white ginseng and Taeguk ginseng according to the preparation process.

Ginseng is known to have good preventive and medical effects for various adult health conditions such as arteriosclerosis, hypertension, stress, fatigue, stamina decrease, hypertension, climacteric diseases, diabetes mellitus, cancer, aging, etc. *Nutrition* 16(5), 391–392(2000); *European Journal of Clinical Pharmacology,* 55(8), 567–575(1999).

In industry, ginseng is extracted using solvents such as hot water or alcohols. Ginseng residue, which is a by-product of extracting ginseng, is a kind of dietary fiber consisting of polysaccharides. Even though ginseng residue has the potential to be used as dietary fiber material with various physiological properties, it has been widely used as animal feed or simply discarded.

Dietary fiber consisting of various non-starch polysaccharide components such as cellulose, hemicellulose, pectin, etc. is not digested by human enzymes. The most important factor which determines physiological activity of dietary fiber is solubility (*Food Technology,* 41(2), 81–85(1987)). Dietary fiber is classified into water-insoluble dietary fiber and water-soluble dietary fiber. Water-insoluble dietary fiber exhibits physiological functions such as increasing the size of excrement, reducing the time required for digested food to pass through the intestines, inhibiting starch hydrolysis, delaying glucose absorption, etc., which is attributed to a large amount of water absorption when water-insoluble dietary fiber passes through digestive organs. In contrast, a three-dimensional gel structure constructed by water-soluable dietary fiber delays the passage of food and prevents absorption of glucose. In particular, it is well known that water-soluble dietary fiber functions to decrease blood cholesterol levels.

Oligosaccharides are carbohydrates with low molecular weight and are classified into two groups according to the method used to produce them. Oligosaccharides such as isomalto-oligosaccharides, fructo-oligosaccharides, galacto-oligosaccharides, etc. are prepared by enzymatic bioconversion of sugars, while inulin oligosaccharides, alginate oligosaccharides, chitosan oligosuccharides, etc. are produced by hydrolysis of polysaccharides (*Food Industry and Nutrition* 3(1), 18–23(1998)).

Oligosaccharides are physiologically active as a bifidogenic factor that accelerates proliferation of useful intestinal microbes. Oligosaccharides produced by hydrolysis of polysaccharides have various physiological and pharmaceutical functions such as decreasing blood cholesterol levels, killing bacteria, activating the immune system, preventing/inhibiting cancer, etc. (*Lebensm. Wiss. Technol.,* 27, 1–9 (1996); *Tren. Food Sci. Technol.,* 7, 353–368(1996)).

A plant cell wall is composed of polysaccharides such as cellulose, hemicelluloses, pectin, etc., lignin and glycoproteins. In most cases, these components do not exist in a free state but exist in a water-insoluble state because of strong covalent, hydrogen and ionic bonds (*Korea Nutrition and Food Society,* 23(2): 358–370(1994)). The solubilization of a plant cell wall structure existing in a water-insoluble state augments the content of water-soluable dietary fiber, which improves physiological characteristics of dietary fiber.

Conventionally, the insoluble dietary fiber components in a plant cell wall can be hydrolyzed by acid or alkali solution at a high temperature. However, this chemical hydrolysis method has various industrial problems such as generation of waste water, container corrosion, generation of unusable residues, structural damage of the cell wall component, etc. (*Carbohydrate Research,* 260, 283–296(1994)).

Therefore, there is need for the development of an environment-friendly solubilization process to produce functional carbohydrate materials from the walls of plant cells. Mechanical or enzymatic solubilization methods are good alternative ways to solubilize plant cell walls without using chemical treatments.

An example of a mechanical solubilization method is an extrusion process. An extruder simultaneously performs a variety of processes such as mixing, cooking, texturizing, drying, sterilizing, cooling, etc. in a single apparatus. The extrusion process, providing high temperature, high pressure and high shear force, is commonly used for manufacturing animal feed and processed food products such as noodles, cereals, etc.

The high shear force provided during the extruding process can also be effectively used for mechanically solubilizing the water-insoluble polysaccharide components in the plant cell walls (*Journal of Food Science,* 63(5), 841–844 (1998)). However, the technology to solubilize water-insoluble plant cell walls by the extruding process has not yet been fully developed. In particular, the extruding process for solubilizing insoluble ginseng cell walls has not yet been applied in industry.

An enzymatic solubilizing method can also be used to effectively solubilize the polysaccharide components of plant cell walls using polysaccharide hydrolytic enzymes. Ginseng residue consists mostly of polysaccharides, so it is very possible to produce oligosaccharides with low molecular weight by polysaccharide hydrolysis of ginseng residue. Ginseng polysaccharides are composed of cellulose, hemisellulose and pectin, and thus the hydrolysis of ginseng polysaccharides can be readily accomplished by using cellulase, hemicellulase, pectinase, etc.

Since polysaccharide hydrolytic enzymes such as cellulose, hemicellulase, and pectinase are commercially available, the enzymatic hydrolysis of polysaccharides can be applied easily for industrial purposes. In particular, since these commercial enzymes are composed of various complex enzymes, they can be more effectively used for the hydrolysis of plant cell walls consisting of complex polysaccharides.

Thus, the present invention is achieved by producing water-soluble dietary fiber from ginseng residue by an extruding process that combines high shear force, high temperature and high pressure, and also by producing ginseng oligosaccharides with low molecular weight from the ginseng residue using polysaccharide hydrolytic enzymes.

Accordingly, it is an object of the present invention to provide a method for producing dietary fiber economically from ginseng residue using an extruder without chemical treatment, and ginseng dietary fiber prepared by the extruding process.

It is another object of the present invention to provide a method for preparing oligosaccharides with low molecular weight from ginseng residue by polysaccharide hydrolysis, and ginseng oligosaccharides prepared by polysaccharide hydrolytic enzymes.

SUMMARY OF THE INVENTION

The above objects of the present invention were achieved by feeding ginseng residue produced as a by-product of ginseng extraction into a twin screw extruder, extruding the ginseng residue by controlling the screw speed, the feed rate and the moisture content; adding water to the extruded ginseng residue, mixing and centrifuging; and preparing water-soluble ginseng dietary fiber from a supernatant and water-insoluble ginseng dietary fiber precipitate obtained after centrifugation.

In addition, the above objects of the prevent invention were achieved by adding polysaccharide hydrolytic enzymes such as cellulase, hemicellulase and pectinase to the ginseng residue; hydrolyzing polysaccharides in the ginseng residue; sequentially passing the polysaccharide hydrolysates through an ultrafiltrator and fractionating the polysaccharide hydrolysates according to molecular weight; and obtaining ginseng oligosaccharides with low molecular weight.

BRIEF DESCRIPTION OF THE DRAWINGS

The present invention will become better understood by describing in detail preferred embodiments thereof with reference to the accompanying drawings in which.

DETAILED DESCRIPTION OF THE PREFERRED EMBODIMENTS

The process for preparing dietary fiber from ginseng residue according to the present invention includes the first step of feeding the ginseng residue into a twin screw extruder, the second step of adding water to the extruded sample, agitating the same and centrifuging, the third step of washing a precipitate by adding isopropanol to the supernatant and evaporating the same to thereby prepare water-soluble dietary fiber, and the fourth step of drying a precipitate obtained from centrifugation in the second step and preparing water-insoluble ginseng dietary fiber.

Figure 1:
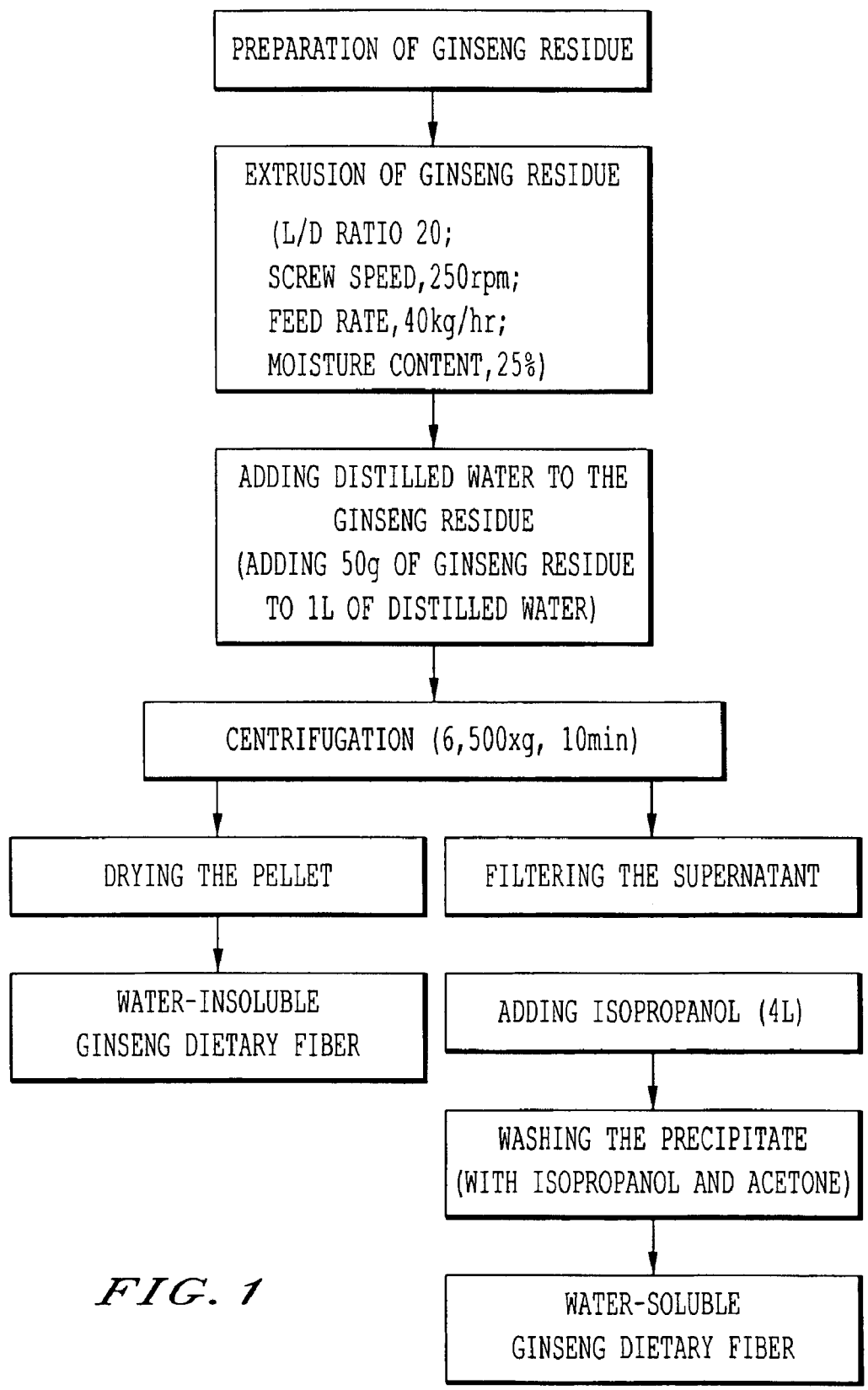
FIG. 1 is a schematic view illustrating a process for preparing ginseng dietary fiber according to the present invention.

A preferred example of preparing dietary fiber from ginseng residue according to the present invention is illustrated in FIG. 1. As shown, a twin-screw extruder used in the first step is a co-rotation intermesing type twin-screw extruder (Buhler Brothers Co., DNDL-40, Switzerland). The extruding conditions were as follows: screw speed—150~400 rpm; feed rate—20~60 kg/hour; moisture content—15~40%; L/D ratio—20~40. Either a single screw or a twin-screw extruder can be used in the present invention, but a twin screw extruder providing greater shear force is preferred for effectively solubilizing water-insoluble ginseng cell walls.

The inventive process for preparing ginseng dietary fiber using the extruding process will be explained in detail below.

Process 1
Preparation of Ginseng Residue

Ginseng extraction was performed by adding solvents such as hot water, ethanol and methanol to raw materials such as red ginseng, white ginseng and Taeguk ginseng. Ginseng residue was recovered as a by-product after the ginseng extraction. Water and solvent remaining in the ginseng residue were evaporated using a heating evaporator and the resulting dry ginseng residue was ground into powder. Starch in the ginseng residue can be removed by –a m ylase treatment. Ginseng residue without starch can be used as a starting material with a higher dietary fiber content.

Process 2
Extrusion of Ginseng Residue

The ginseng residue prepared by the above-described process 1 was fed into a twin-screw extruder with a L/D (length/diameter) ratio of 20~40. The samples were extruded at a feed rate of 20~60 kg/hr, a screw speed of 150~400 rpm, and a moisture content of 15~40%.

Process 3
Preparation of Water-soluble and Water-insoluble Ginseng Dietary Fiber The extruded ginseng residue prepared in process 2 was added to distilled water to form a sample mixture containing 1~10% (w/v) ginseng residue and the sample was agitated for 40~80 minutes. The sample was then centrifuged for 5~15 minutes at 6,000~9,000×g. Water-soluble ginseng dietary fiber was obtained from the supernatant, while water-insoluble ginseng dietary fiber was obtained from the precipitate. The supernatant was filtered, and a 3~5 times greater volume of isopropanol was added to the filtrate. Then, after standing for 3~5 hours the precipitate was washed using isopropanol and acetone and dried at room temperature to thereby prepare water-soluble ginseng dietary fiber.

In the present invention, the method for preparing oligosaccharides from ginseng residue includes the first step of dispersing the ginseng residue into water and hydrolyzing the ginseng residue by the hydrolytic enzymes of the plant cell wall and; the second step of heating the enzyme solution to inactivate the enzymes and centrifuging to separate the supernatant which includes oligosaccharides; and the third step of passing the supernatant through an ultrafiltrator and drying the fractions to prepare ginseng oligosaccharides with varying molecular weight.

Figure 3:
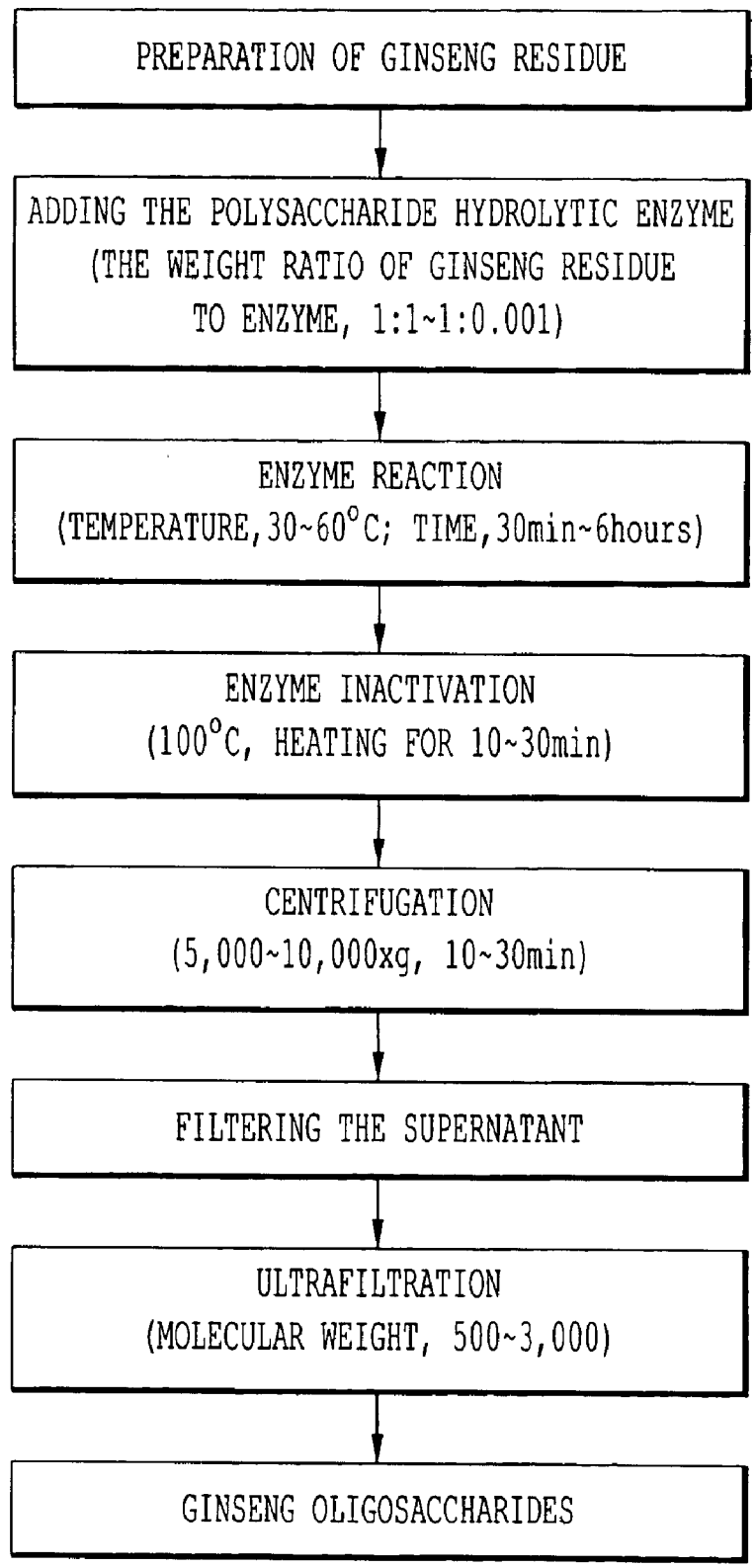
FIG. 3 is a schematic view illustrating a process for preparing ginseng oligosaccharides according to the present invention.

A preferred example for preparing oligosaccharides from ginseng residue is illustrated in FIG. 3. A single commercial polysaccharide hydrolytic enzyme such as cellulase, hemicellulase or pectinase, or a mixture of more than one of these enzymes, was added to hydrolyze the ginseng residue. In this example, Celluclast (Novo Nordisk, Demark) was used as cellulase; Ceremix L (Ceremic L Novo Nordisk, Denmark), Filtrase BR (Gist-Brocades, Netherlands), Ultraflo L (Novo Nordisk, Denmark) as hemicellulases; and Pectinex (Novo Nordisk, Denmark) as a pectinase.

After the enzyme reaction, ginseng oligosaccharides were obtained from the supernatant after centrifugation, and separated according to molecular weight using an ultrafiltrator.

The inventive method for preparing oligosaccharides from ginseng residue using polysaccharide hydrolytic enzymes will be explained in detail below.

Process 1
Preparation of Ginseng Residue

Ginseng extraction was performed by adding solvents such as hot water, ethanol or methanol to raw materials such as red ginseng, white ginseng and Taeguk ginseng. Ginseng residue was recovered as a by-product after the ginseng extraction. Water and solvent remaining in the ginseng residue were evaporated using a beating evaporator and the resulting dry ginseng residue was ground into powder. Starch in the ginseng residue can be removed by --amylase treatment. Ginseng residue without starch can be used as a starting material with a higher dietary fiber content.

Process 2
Polysaccharide Hydrolytic Enzyme Treatment Process

The extruded ginseng residue prepared in the above-described process 1 was added to distilled water to form a sample mixture containing 1~10%(w/v) ginseng residue and the sample was agitated for 40~80 minutes. One or a mixture of cellulase, hemicellulase and pectinase, which are commercially available polysaccharide hydrolytic enzymes, was added at a weight ratio of 1:1~1:0.001 with respect to the ginseng residue, and the sample was agitated at 30~60° C. for 30~480 minutes. The sample was then heated at 100° C. for 15 minutes to inactivate the enzymes and centrifuged at 5,000~10,000×g for 10~30 minutes to thereby obtain water-soluble ginseng oligosaccharides solution from the supernatant. The precipitate can be used as water-insoluble dietary fiber by drying the same.

Process 3
Fractionation of Ginseng Oligosaccharides Using an Ultrafine Filter

The ginseng oligosaccharides solution prepared in process 2 above was sequentially passed through an ultrafiltrator for passing ginseng oligosaccharides with a molecular weight of 500~5,000, and the filtered solution was dried to thereby prepare ginseng oligosaccharides.

The method for preparing ginseng dietary fiber and oligosaccharides will be explained in detail below. The scope of the claims of the present application is not limited to the examples provided herein.

EXAMPLE 1

Preparation of Ginseng Dietary Fiber

Ginseng residue was fed into a twin-screw extruder with an L/D ratio of 20. The extruder was operated at a screw speed of 250 rpm, a feed rate of 40 kg/hr, and a moisture content of 25%. 50 g of the extruded ginseng residue was dispersed into 1 L of water and agitated for 1 hour, followed by centrifuging at 6,500×g for 10 minutes. The precipitate was dried at room temperature to thereby prepare water-insoluble dietary fiber. The supernatant was filtered, and 4 L of isopropanol was added to the filtrate. After standing for 4 hours, the precipitate was washed using isopropanol and acetone and dried at room temperature to thereby prepare water-soluble ginseng dietary fiber. The yield of water-soluble ginseng dietary fiber was 15.4% based on the initial amount of the ginseng residue. This result means that water-soluble dietary fiber components can be successfully isolated from the ginseng residue by the extrusion process.

Ginseng dietary fiber prepared according to the present invention can be applied for preparing food products such as beverages, yogurt, bread, candy, health food, etc.

Experiment 1
Measurement of the Molecular Weight of Water-soluble Ginseng Dietary Fiber Prepared in Example 1

Figure 2A:
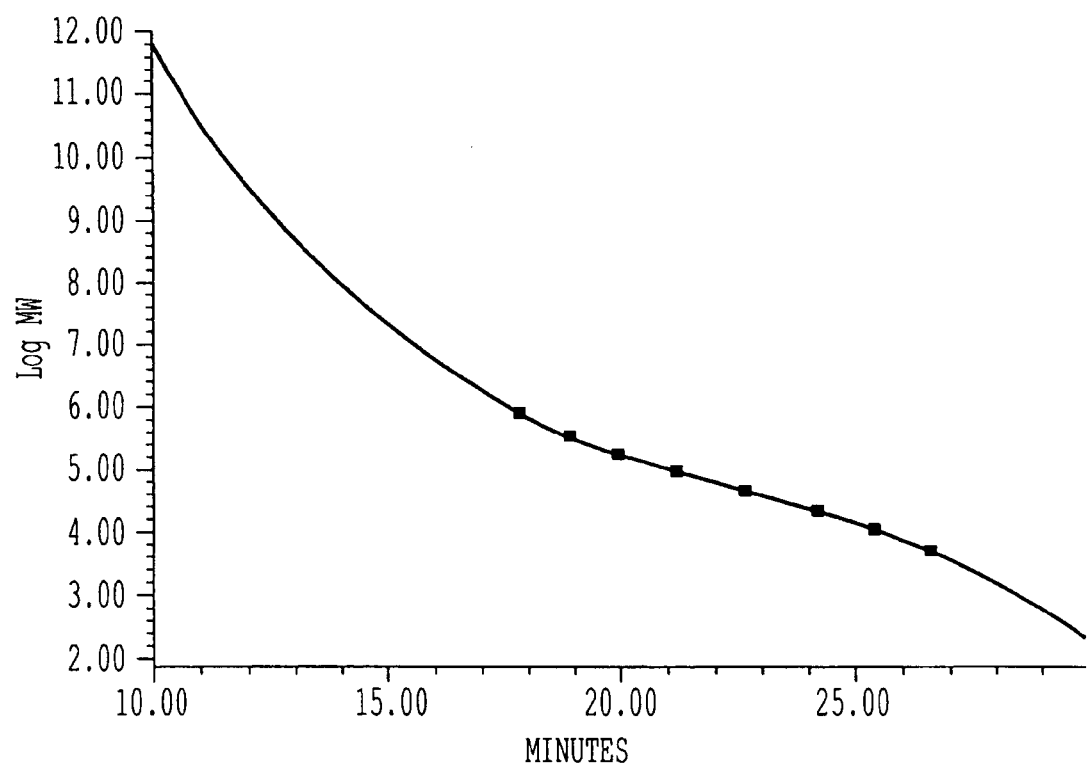
FIG. 2a is a standard curve of gel permeation chromatography carried out using pullulan as a standard material according to the present invention.
Figure 2B:
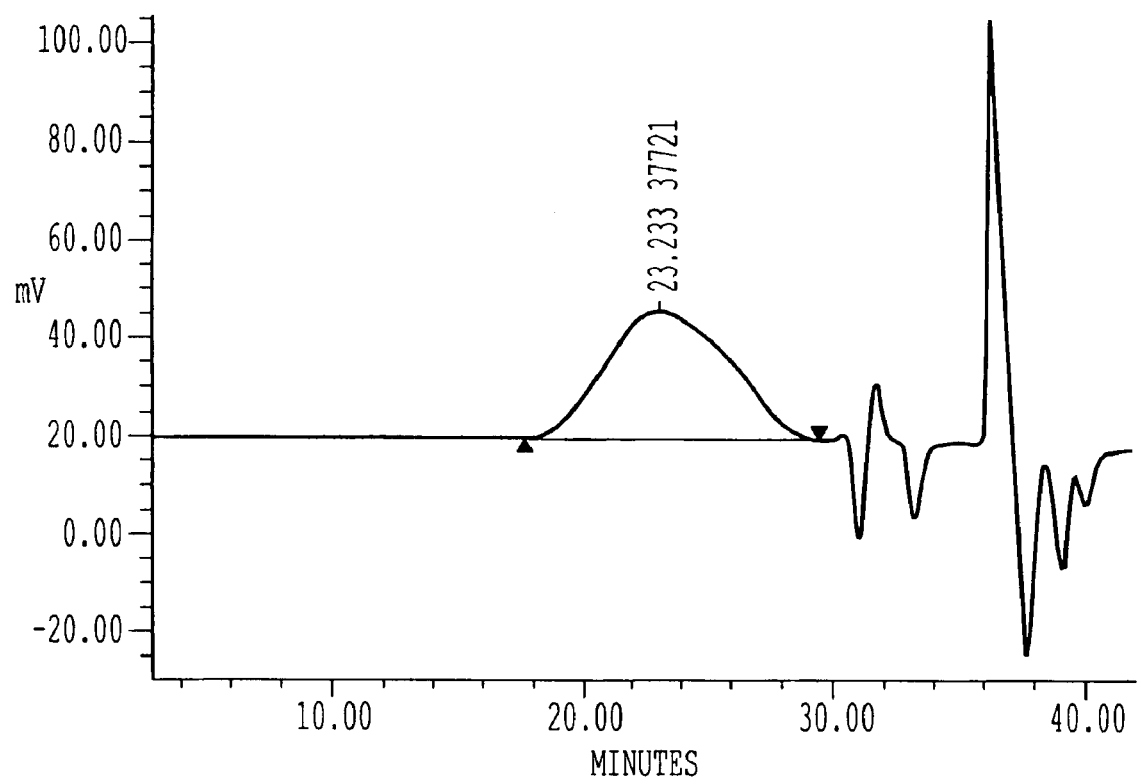
FIG. 2b is a view illustrating a result of gel permeation chromatography that represents the molecular weight of water-soluble ginseng dietary fiber according to the present invention.

The molecular weight of the water-soluble ginseng dietary fiber prepared in Example 1 was measured using gel permeation chromatography (GPC; Waters LC Module I, USA). The detector was a M410-RI equipped with a heating chamber and M2010 Millennium software was used for the data analysis. The column used was Ultrahydrogel 250 & 1000 linear column (Waters, USA). A mixture of 0.1M acetic acid and 0.1M NaCl was used as a mobile phase, and its elution rate was 1.0 mL/min. FIG. 2a is a standard curve of GPC using pullulan as a standard. FIG. 2b shows that the weight average molecular weight of the water-soluble ginseng dietary fiber prepared in Example 1 was 97,000.

EXAMPLE 2

Effect of the Extrusion Conditions on the Preparation of Ginseng Dietary Fiber

As shown in Table 1, the extrusion of ginseng residue to prepare water-soluble ginseng dietary fiber was repeated for different screw speeds, feed rates and moisture contents. The production yield and molecular weight of water-soluble dietary fiber were determined by the methods described in Example 1 and Experiment 1, respectively, Table 1 shows that the production yield of water-soluble dietary fiber was 12.6~25.4%, and the molecular weight was 43,000~126,000 depending on the extruding conditions. In general, as the moisture content was decreased, the production yield was increased and the molecular weight was decreased. This means that it is possible to produce ginseng dietary fiber with various yields and molecular weights by controlling the extrusion conditions.

TABLE 1

Yield and molecular weight of water-soluble ginseng dietary fiber for varied extrusion conditions (screw speed, feed rate and moisture content)

| Screw speed (rpm) | Feed rate (kg/hr) | Moisture (%) | Yield (%) | Molecular weight |
|---|---|---|---|---|
| 150 | 35 | 30 | 13.3 | 126,000 |
| 150 | 50 | 15 | 22.1 | 43,000 |
| 250 | 35 | 30 | 14.2 | 93,000 |
| 300 | 35 | 30 | 14.8 | 89,000 |
| 250 | 40 | 20 | 20.6 | 67,000 |
| 250 | 30 | 15 | 25.4 | 42,000 |
| 300 | 60 | 40 | 12.6 | 114,000 |
| 300 | 40 | 30 | 13.9 | 107,000 |
| 350 | 30 | 25 | 18.6 | 74,000 |
| 250 | 30 | 25 | 17.9 | 77,000 |
| 350 | 35 | 30 | 14.3 | 103,000 |
| 300 | 35 | 25 | 16.6 | 72,000 |
| 350 | 40 | 25 | 17.4 | 78,000 |

TABLE 1-continued

Yield and molecular weight of water-soluble ginseng dietary fiber for varied extrusion conditions (screw speed, feed rate and moisture content)

| Screw speed (rpm) | Feed rate (kg/hr) | Moisture (%) | Yield (%) | Molecular weight |
|---|---|---|---|---|
| 300 | 30 | 30 | 15.8 | 82,000 |
| 350 | 35 | 20 | 20.6 | 59,000 |
| 300 | 40 | 20 | 20.4 | 64,000 |
| 400 | 35 | 25 | 17.7 | 82,000 |
| 400 | 20 | 40 | 14.6 | 98,000 |

EXAMPLE 3

Preparation of Ginseng Dietary Fiber by Changing the L/D Ratio of Extruder

Ginseng residue was fed into a twin-screw extruder with an L/D ratio of 40, and extrusion was performed under the same conditions as in Example 1. By increasing the L/D ratio, the yield of water-soluble dietary fiber was increased to 19.5%, while the molecular weight was decreased to 55,000. This result is interpreted as showing that the residence time of the ginseng residue was increased in the extruder due to the increased L/D ratio, which resulted in the increased production yield of water-soluble dietary fiber. Therefore, it is also possible to control the yield and the molecular weight of ginseng dietary fiber by changing the L/D ratio of the extruder.

Comparative Example 1

Comparison Between the Yield of Ginseng Dietary Fiber of the Present Invention and the Yield of Ginseng Dietary Fiber Prepared by the Conventional Acid Treatment Process 50 g of ginseng residue was dispersed into 1 L of HCl solution, pH 1.8, and was agitated at 85° C. for 30 minutes and then filtered. Then, 4 L of isopropanol was added to the supernatant. After standing for 4 hours, the precipitate was washed using isopropanol and acetone and dried at room temperature to thereby prepare water-soluble ginseng dietary fiber. The yield of the water-soluble ginseng dietary fiber by the acid treatment was 14.5%.

Therefore, comparing the yield of the extrusion process (15.4%) in Example 1 with that of the acid process (14.5%), it is clear that the extrusion process of the present invention is very effective in producing water-soluble dietary fiber without using acid treatment.

EXAMPLE 4

Preparation of Ginseng Oligosaccharides 20 g of ginseng residue was dispersed into 500 ml of water and agitated for 30 minutes. Then, 2.0 g of Filtrase BR (Gist-Brocades, Netherlands) was added and agitated at 50° C. for 2 hours. After heating at 100° C. for 20 minutes to inactivate the enzyme, the resulting sample was centrifuged at 6,000×g for 10 minutes, and then the supernatant was filtered and dried. The yield of ginseng oligosaccharides was determined to be 56.7%. This result means that ginseng oligosacchrides can be successfully isolated from ginseng residue by polysaccharide hydrolytic enzymes.

Ginseng oligosaccharides prepared according to the present invention can be applied to food products such as beverages, yogurt, candy, bread, health food, etc.

Experiment 2
Measurement of the Molecular Weight of Ginseng Oligosaccharides Prepared in Example 4

Figure 4A:
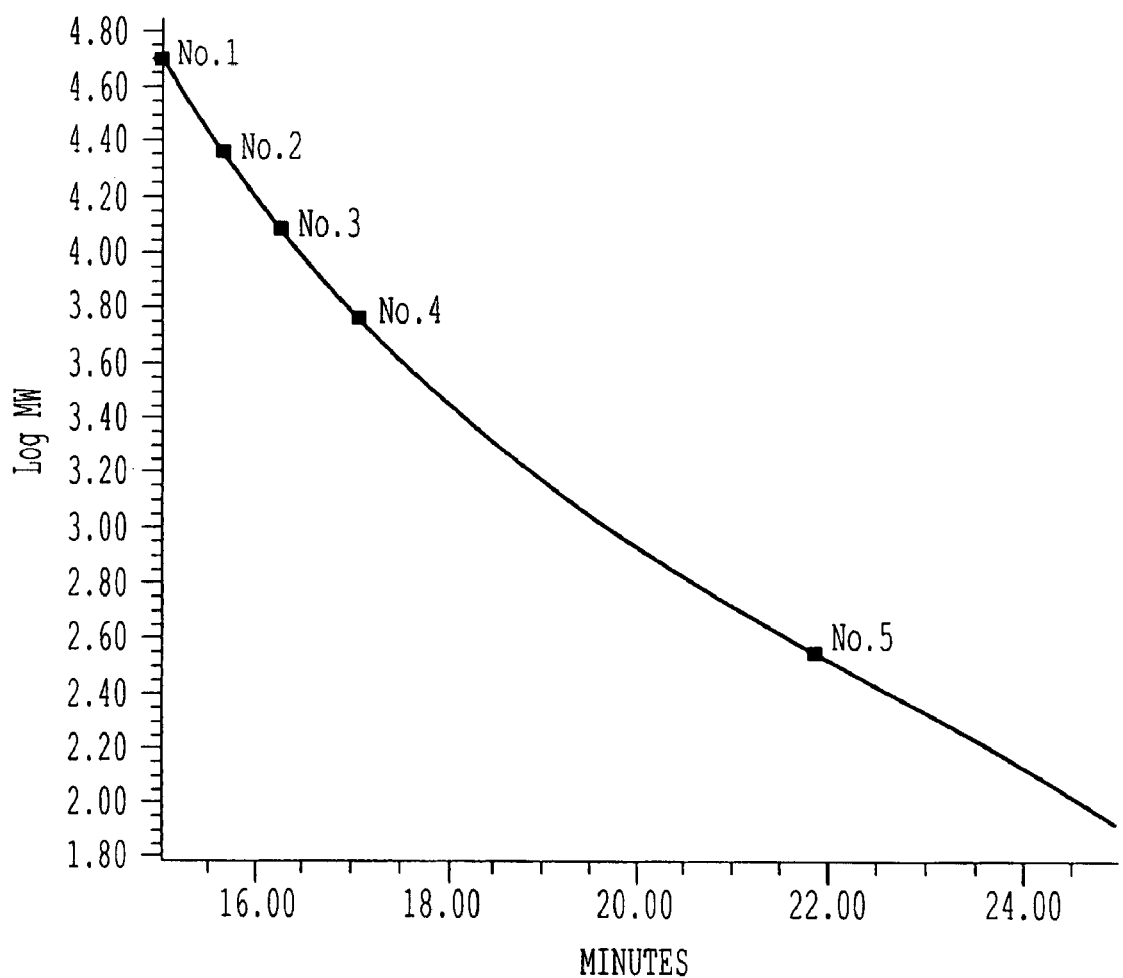
FIG. 4a is a standard curve of gel permeation chromatography carried out using pullulan and lactose as standard materials according to the present invention.

The molecular weight of the ginseng oligosaccharides prepared in Example 4 was measured using gel permeation chromatography (GPC; Waters LC Module I, USA). The detector was a M410-RI equipped with a heating chamber and M2010 Millennium software was used for the data analysis. The column used was Ultrahydrogel 125 & 250 linear column (Waters, USA). 0.1M $NaNO_3$ solution was used as a mobile phase, and its elution rate was 0.8 mL/min. FIG. 4a is a standard curve of GPC using pullulan and lactose as standard materials.

Figure 4B:
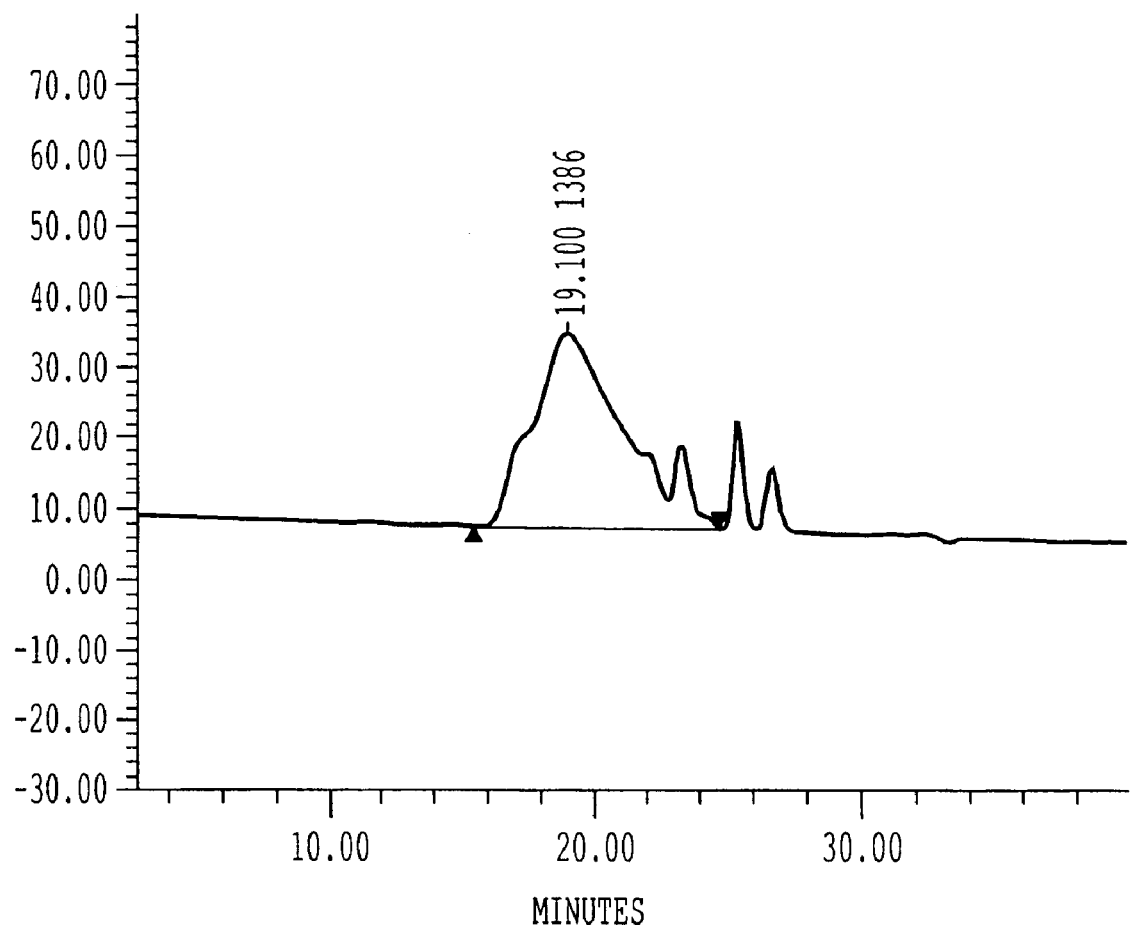
FIG. 4b is a view illustrating a result of gel permeation chromatography that represents the molecular weight of ginseng oligosaccharides according to the present invention.

As shown in FIG. 4b, the weight average molecular weight of the ginseng oligosaccharides prepared in Example 4 was 1,050.

Experiment 3
The Proliferation Effect of Ginseng Oligosaccharides on Intestinal Microbes In this experiment, *Bifidobacterium longum,* isolated from Korean excrement in the Korea Food Research Institute, was used as an intestinal microbe (*Korean J. Dairy Sci.,* 11(1), 16–25, 1989). *Bifidobacterium longum* was grown in a 20 mL MRS broth of Table 2 under an anaerobic condition and then used for this experiment. An oligosaccharides free culture media was used as a control. *Bifidobacterium longum* was injected into the culture media with and without ginseng oligosaccharides, respectively, and the *Bifidobacterium longum* was cultured in an incubator at 37° C. The culture solution was sampled every two hours, and the light absorbance was measured at 660 nm to thereby obtain a growth curve.

Figure 5:
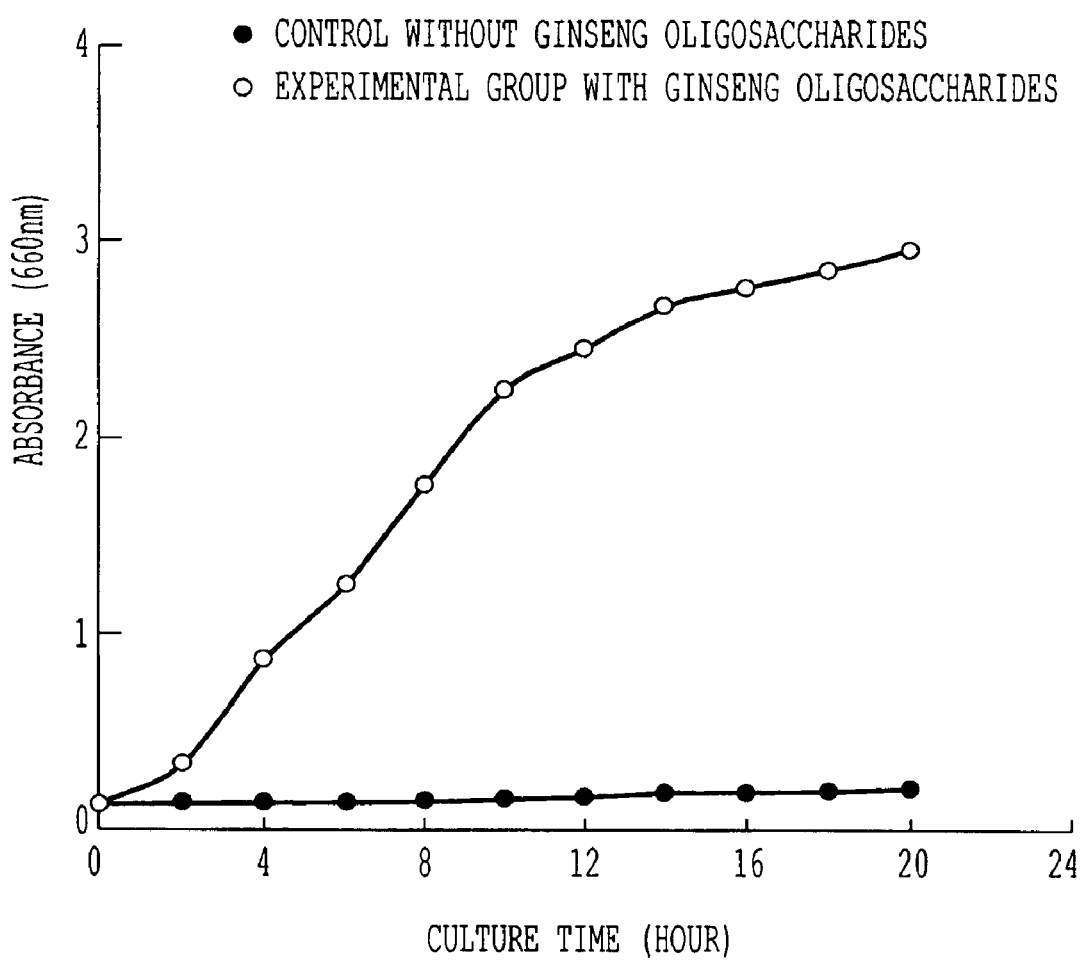
FIG. 5 is a growth curve of *Bifidobacterium longum* in a culture media with ginseng oligosaccharides according to the present invention.

FIG. 5 shows that, when ginseng oligosaccharides were added to the culture media, the absorbance was 2.95 after 20 hours. In contrast, the absorbance was only 0.22 in the control culture broth without ginseng oligosaccharides. This means that ginseng oligosaccharides prepared according to the present invention are a catalyst to the growth of intestinal microbes.

TABLE 2

Composition of MRS broth for *Bifidobacterium longum* cultures

| Ingredient | Amount |
|---|---|
| Peptone | 20 g |
| Meat extract | 10 g |
| Enzyme extract | 1 mL |
| Tween 80 | 2 g |
| Ammonium citrate | 5 g |
| Sodium acetate | 0.1 g |
| $MgSO_4$ $7H_2O$ | 0.05 g |
| $MnSO_4$ $5H_2O$ | 2 g |
| Agar | 15 g |
| Ginseng oligosaccharides | 20 g |

[Note]
total volume of culture media 1 L, pH 6.0

EXAMPLE 5

Effects of the Type of Hydrolytic Enzymes Used for Ginseng Oligosaccharides Preparation 20 g of ginseng residue was dispersed into 500 ml of water and agitated for 30 minutes. Then, 0.1 g of each of Celluclast (Novo Nordisk, Denmark), Ultraflo L (Novo Nordisk, Denmark), Ceremic (Novo Nordisk, Denmark), Pectinex (Novo Nordisk, Denmark), and Filtrase BR (Gist- Brocades, Netherlands) were added to respective samples to prepare ginseng oligosaccharides under the conditions shown in Table 3. The production yield and the molecular weight of the prepared water-soluble ginseng oligosaccharides were measured by the methods described in Example 4 and Experiment 2, respectively.

As shown in Table 3, the production yield of ginseng oligosaccharides ranged from 19.6% to 43.1% depending on the type of hydrolytic enzymes used, and the molecular weight was 1,180~1,820. These results mean that it is possible to produce ginseng oligosaccharides with various yields and molecular weights by varying the types of hydrolytic enzymes used.

TABLE 3

Yield and molecular weight of ginseng oligosaccharides for different kinds of the hydrolytic enzymes

| Enzymes | Reaction Temp. | Reaction time | Reaction pH | Yield (%) | Molecular weight |
|---|---|---|---|---|---|
| Celluclast | 60° C. | 1 hour | 5.0 | 20.5 | 1,820 |
| Ceremix | 30° C. | 1 hour | 6.5 | 38.9 | 1,530 |
| Filtrase | 50° C. | 1 hour | 6.0 | 43.1 | 1,250 |
| Pectinex | 50° C. | 1 hour | 5.0 | 40.7 | 1,180 |
| Ultraflo | 50° C. | 1 hour | 6.0 | 20.3 | 1,470 |

EXAMPLE 6

Effect of Hydrolytic Enzyme Mixtures on Ginseng Oligosaccharide Preparation

Equal weights of Celluclast and each of the other enzymes used in Example 5 were mixed and used to treat ginseng residue under the same conditions as in Example 4. The production yield and the molecular weight of the obtained water-soluble ginseng oligosaccharides were measured by the methods described in Example 4 and Experiment 2, respectively.

As shown in Table 4, the mixtures of Celluclast and the other enzymes resulted in oligosaccharide yields ranging from 33.1% to 50.4%, which is much higher than the 20.5% yield of Celluclast alone obtained in Example 5. This result means that appropriate enzyme mixture systems can greatly improve the production yield of ginseng oligosaccharides.

TABLE 4

Yield and molecular weight of ginseng oligosaccharides based on the mixing of the hydrolytic enzymes

| Enzyme mixture | Reaction Temp. | Reaction time | Reaction pH | Yield (%) | Molecular weight |
|---|---|---|---|---|---|
| Celluclast + Ceremix | 40° C. | 1 hour | 6.0 | 38.5 | 1,670 |
| Celluclast + Filtrase | 50° C. | 1 hour | 6.0 | 48.6 | 1,320 |
| Celluclast + Pectinex | 50° C. | 1 hour | 6.0 | 47.2 | 1,120 |
| Celluclast + Ultraflo | 50° C. | 1 hour | 6.0 | 33.6 | 1,420 |
| Celluclast + Filtrase + Pectinex | 50° C. | 1 hour | 6.0 | 50.4 | 980 |

EXAMPLE 7

Fractionation of Ginseng Oligosaccharides Using an Ultrafiltrator

The ginseng oligosaccharides prepared in Example 4 were sequentially passed through an ultrafiltrator for passing ginseng oligosaccharides with molecular weight 500~3000 and then dried. As shown in Table 5, it is possible to prepare ginseng oligosaccharides with various ranges of molecular weight.

TABLE 5

Yield of ginseng oligosaccharides depending on the molecular weight fractions after ultrafiltration

| Molecular weight fraction | Yield (%) | | | | |
|---|---|---|---|---|---|
| | Celluclast | Ceremix | Filtrase | Pectinex | Ultraflo |
| >3000 | 9.4 | 10.6 | 8.9 | 8.1 | 7.4 |
| 1,000~3,000 | 30.9 | 28.5 | 15.6 | 20.7 | 25.3 |
| 500~1,000 | 39.1 | 40.7 | 52.1 | 53.4 | 47.6 |
| <500 | 20.6 | 20.2 | 23.4 | 17.8 | 19.7 |

Industrial Applicability

The present invention provides methods of producing water-soluble dietary fiber and oligosaccharides from ginseng residue using an extrusion process and polysaccharide hydrolytic enzymes, respectively. Since physiologically active dietary fiber and oligosaccharide materials can be effectively produced from ginseng residue without chemical treatment, the methods of the present invention are environment-friendly.

In addition, it is possible to prepare ginseng dietary fibers with various ranges of molecular weight by varying extrusion conditions. It is also possible to prepare ginseng oligosaccharides with various ranges of molecular weight by using different types of hydrolytic enzymes and varying ultrafiltration conditions.

What is claimed is:

1. A process for preparing water-insoluble ginseng dietary fiber, comprising:
   (a) obtaining a ginseng residue produced as a by-product of ginseng extraction, and drying and grinding the ginseng residue;
   (b) feeding the dried and ground ginseng residue into a twin-screw extruder with a L/D ratio of 20~40 and operating the twin-screw extruder at a screw speed of 150~400 rpm, a feed rate of 20~60 kg/hr and a moisture content of 15~40% to produce an extruded ginseng residue;
   (c) adding the extruded ginseng residue to water at a concentration of 1~10% (w/v) to prepare a sample, agitating and centrifuging the sample to produce a supernatant and a precipitate; and
   (d) drying the precipitate obtained by centrifugation to obtain water-insoluble ginseng dietary fiber.

2. Water-insoluble ginseng dietary fiber prepared by the process of claim 1.

3. A process for preparing water-soluble ginseng dietary fiber, comprising:
   (a) obtaining a ginseng residue produced as a by-product of ginseng extraction, and drying and grinding the ginseng residue;
   (b) feeding the dried and ground ginseng residue into a twin-screw extruder with a L/D ratio of 20~40 and operating the twin-screw extruder at a screw speed of 150~400 rpm at a feed rate of 20~60 kg/hr and a moisture content of 15~40% to produce an extruded ginseng residue;
   (c) adding the extruded ginseng residue to water at a concentration of 1~10% (w/v), agitating and centrifuging the sample to produce a supernatant and a precipitate; and (d) filtering the supernatant to obtain water-soluble ginseng dietary fiber and a filtrate, adding isopropanol to the filtrate, the volume of isopropanol added being 3~5 times greater than the volume of the filtrate, obtaining a second precipitate, washing the second precipitate with isopropanol and acetone, drying the second precipitate and obtaining further water-soluable ginseng dietary fiber.

4. Water-soluble ginseng dietary fiber prepared by the process of claim 3.

5. The water-soluble ginseng dietary fiber of claim 4, wherein said fiber has a molecular weight of 43,000–126,000.

* * * * *